United States Patent
Nanjundiah et al.

(10) Patent No.: US 7,833,392 B2
(45) Date of Patent: *Nov. 16, 2010

(54) CHLORINE DIOXIDE SOLUTION GENERATOR

(75) Inventors: Chenniah Nanjundiah, San Diego, CA (US); Larry L. Hawn, Laguna Niguel, CA (US); Jeffrey M. Dotson, Fort Worth, TX (US)

(73) Assignee: Pureline Treatment Systems, LLC, Irvine, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 11/548,611

(22) Filed: Oct. 11, 2006

(65) Prior Publication Data

US 2007/0104637 A1    May 10, 2007

Related U.S. Application Data

(63) Continuation-in-part of application No. 11/289,813, filed on Nov. 30, 2005, which is a continuation-in-part of application No. 11/145,398, filed on Jun. 3, 2005, now Pat. No. 7,799,198, which is a continuation-in-part of application No. 10/902,681, filed on Jul. 29, 2004, now Pat. No. 7,754,057.

(51) Int. Cl.
  C25B 9/00      (2006.01)
  B01J 7/00      (2006.01)
  C25B 1/26      (2006.01)
(52) U.S. Cl. ........................ 204/266; 422/305; 205/618
(58) Field of Classification Search .................. None
  See application file for complete search history.

(56) References Cited

U.S. PATENT DOCUMENTS

| | | | |
|---|---|---|---|
| 4,276,262 A | 6/1981 | Cowley | |
| 4,336,228 A | 6/1982 | Cowley | |
| 4,486,399 A * | 12/1984 | Lobley | 423/478 |
| 4,639,340 A * | 1/1987 | Garrett | 261/36.1 |
| 4,680,119 A * | 7/1987 | Franklin, Jr. | 210/512.1 |
| 4,761,208 A * | 8/1988 | Gram et al. | 205/625 |
| 4,798,715 A * | 1/1989 | Hardee et al. | 205/556 |
| 5,006,326 A * | 4/1991 | Mayurnik et al. | 423/477 |
| 5,301,718 A * | 4/1994 | Bolhofner | 137/893 |
| 5,792,441 A | 8/1998 | Paleologou et al. | |
| 5,965,004 A * | 10/1999 | Cowley et al. | 205/499 |
| 5,968,454 A | 10/1999 | Deacon et al. | |
| 6,051,135 A | 4/2000 | Lee et al. | |
| 6,171,558 B1 | 1/2001 | Simpson | |
| 6,274,009 B1 | 8/2001 | Krafton et al. | |
| 6,468,479 B1 * | 10/2002 | Mason et al. | 422/187 |
| 2005/0061741 A1 | 3/2005 | Mainz et al. | |

FOREIGN PATENT DOCUMENTS

WO    WO-02/14216 A    2/2002

* cited by examiner

*Primary Examiner*—Harry D Wilkins, III
(74) *Attorney, Agent, or Firm*—McAndrews, Held & Malloy, Ltd.

(57) ABSTRACT

A chlorine dioxide solution generator includes a chlorine dioxide gas source. An eductor system is fluidly connected to the chlorine dioxide gas source for at least partially effecting the dissolution of chlorine dioxide gas into an aqueous liquid stream. An absorption system is fluidly connected to the eductor system that is capable of effecting additional dissolution of the chlorine dioxide gas into said aqueous liquid.

12 Claims, 3 Drawing Sheets

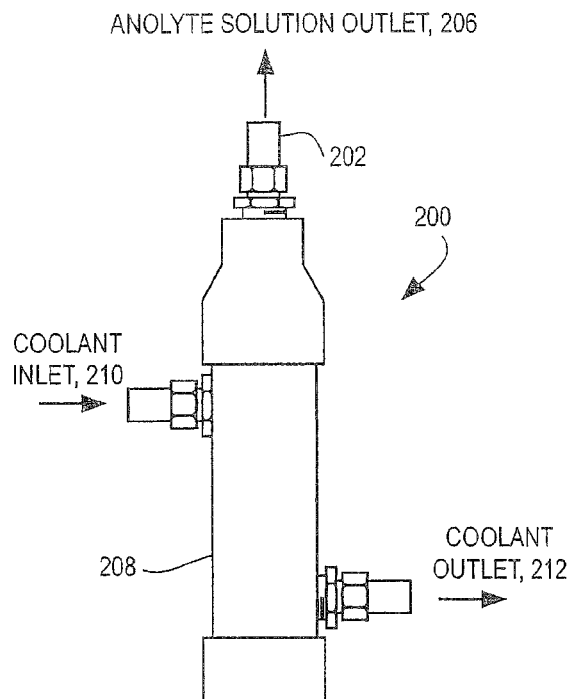
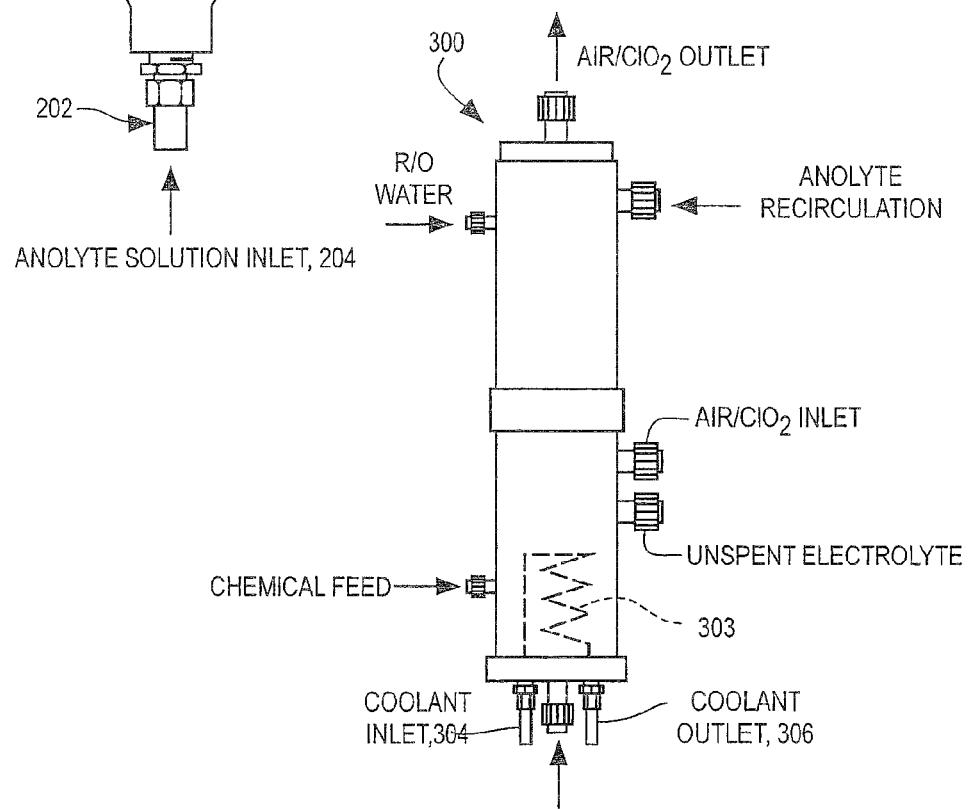

CHLORINE DIOXIDE SOLUTION GENERATOR

CROSS-REFERENCE TO RELATED APPLICATIONS(S)

This application is a continuation-in-part of U.S. patent application Ser. No. 11/289,813 filed on Nov. 30, 2005, entitled "High-Capacity Chlorine Dioxide Generator," which is, in turn, a continuation-in-part of U.S. patent application Ser. No. 11/145,398 now U.S. Pat. No. 7,799,198 filed on Jun. 3, 2005, entitled "Chlorine Dioxide Solution Generator With Temperature Control Capability," which is, in turn, a continuation-in-part of U.S. patent application Ser. No. 10/902,681 filed on Jul. 29, 2004, entitled "Chlorine Dioxide Solution Generator," now U.S. Pat. No. 7,754,057. The '813, '398 and '681 applications are each hereby incorporated by reference herein in their entirety.

FIELD OF THE INVENTION

The present invention relates generally to chlorine dioxide solution generators. More particularly, the present invention relates to chlorine dioxide solution generators in which an eductor system and an absorption system are used to increase generator reliability.

BACKGROUND OF THE INVENTION

Chlorine dioxide ($ClO_2$) has many industrial and municipal uses. When produced and handled properly, $ClO_2$ is an effective and powerful biocide, disinfectant and oxidizer.

$ClO_2$ is used extensively in the pulp and paper industry as a bleaching agent, but is gaining further support in such areas as disinfection in municipal water treatment. Other end-uses can include disinfection in the food and beverage industries, wastewater treatment, industrial water treatment, cleaning and disinfection of medical wastes, textile bleaching, odor control for the rendering industry, circuit board cleansing in the electronics industry and uses in the oil and gas industry.

In water treatment applications, $ClO_2$ is primarily used as a disinfectant for surface waters with odor and taste problems. It is an effective biocide at low concentrations and over a wide pH range. $ClO_2$ is desirable because when it reacts with an organism in water, chlorite results, which studies to date have shown does not pose a significant adverse risk to human health at a concentration of less than 0.8 parts per million (ppm) of chlorite. The use of chlorine, on the other hand, can result in the creation of chlorinated organic compounds when treating water. Such chlorinated organic compounds are suspected to increase cancer risk.

Producing $ClO_2$ gas for use in a chlorine dioxide water treatment process is desirable because there is greater assurance of $ClO_2$ purity when in the gas phase. $ClO_2$ is, however, unstable in the gas phase and will readily undergo decomposition into chlorine gas ($Cl_2$), oxygen gas ($O_2$) and heat. The high reactivity of $ClO_2$ generally requires that it be produced and used at the same location. $ClO_2$ is, however, soluble and stable in an aqueous solution.

The production of $ClO_2$ can be accomplished both by electrochemical and reactor-based chemical methods. Electrochemical methods have an advantage of relatively safer operation compared to reactor-based chemical methods. In this regard, electrochemical methods employ only one precursor, such as a chlorite solution, unlike the multiple precursors that are employed in reactor-based chemical methods. Moreover, in reactor-based chemical methods, the use of concentrated acids and chlorine gas poses a safety concern.

Electrochemical cells are capable of carrying out selective oxidation reaction of chlorite to $ClO_2$. The selective oxidation reaction product is an anolyte solution containing dissolved $ClO_2$ and residual reactants. To further purify the $ClO_2$, the $ClO_2$ gas is separated from the anolyte solution using a randomly packed stripper column. The anolyte solution is sprayed at the top of the packed stripper column while air flows in a counter current direction. The $ClO_2$ that is in solution exchanges from solution to air at a solution-air interface.

Suction of $ClO_2$ gas and air from the stripper column can be accomplished using an eductor or a vacuum gas transfer pump, as described in copending and co-owned application Ser. No. 10/902,681. However, the use of a traditional eductor system to deliver a $ClO_2$ solution directly to a pressurized water system can raise reliability concerns as described in the '681 application. A vacuum gas transfer pump can alternatively be employed. The electrolytic cells described in the '813, '398 and '681 applications can, however, have increased maintenance issues for vacuum gas transfer pumps as the $ClO_2$ gas generation rate increases. For instance, in the high-capacity $ClO_2$ generator described in the '813 application, more vacuum gas transfer pumps between the stripper column and the absorption loop may be needed as $ClO_2$ gas production increases.

Unlike vacuum gas transfer pumps, which have moving parts, eductors operate on a Venturi principle where a liquid is forced through a nozzle at a high velocity to create a pressure drop without moving parts. Eductors consist of two basic components: a motive nozzle for converting pressure energy to kinetic (velocity) energy, and a suction chamber where entrainment and mixing may occur. Thus, the use of an eductor in a $ClO_2$ gas generation system typically increases system reliability over the use of a vacuum gas transfer pump. However, the gas suction rate of an eductor depends on the differential pressure between the inlet and outlet water pressure. Depending on the end-use application for a $ClO_2$ solution, discharge pressures varying from 0 psig to 200 psig (101 kPa to 1,480 kPa) can be encountered. As the discharge pressure varies for the end-use application, the differential pressure in the eductor will also vary and cause changes in the air suction rate. Changes in the air suction rate lead to varying concentrations of $ClO_2$ in air instead of a desired ratio of $ClO_2$ to air that is relatively constant. Thus, the use of an eductor system to directly feed a $ClO_2$ solution to a pressurized water system can lead to decreased generator reliability.

Electrochemical $ClO_2$ generators, such as those described and claimed in the '813, '398 and '681 applications, can be utilized to obtain a higher yield of $ClO_2$ gas or $ClO_2$ solution than those previously disclosed. This can be accomplished by applying a higher current to the electrochemical cell than those previously applied. Applying a higher current to the cell increases the rate of the selective oxidation reaction of chlorite to $ClO_2$, which results in a higher yield of $ClO_2$ gas. A higher yield of $ClO_2$ gas ultimately results in a higher yield of $ClO_2$ solution. However, when more current is applied to the electrochemical $ClO_2$ generator cell to increase the production of $ClO_2$ gas, more heat is generated in the electrolytic cell anolyte loop. It is known that $ClO_2$ is unstable and capable of decomposing, in an exothermic reaction, to chlorine and oxygen. Due to this instability, an operating temperature greater than about 163° F. (73° C.) can result in potentially hazardous and less efficient operation of the $ClO_2$ generator.

Accordingly, it would be desirable to provide a $ClO_2$ solution generator capable of reliably operating at varying $ClO_2$ gas generation rates. Moreover, it would be desirable to provide a $ClO_2$ solution generator than can reliably deliver a $ClO_2$ solution into an end-use system that is pressurized.

SUMMARY OF THE INVENTION

The present chlorine dioxide solution generator includes a chlorine dioxide gas source and an eductor system for at least partially effecting the dissolution of chlorine dioxide gas into an aqueous liquid stream. The eductor system is fluidly connected to the chlorine dioxide gas source. An absorption system is fluidly connected to the eductor system that is capable of effecting additional dissolution of the chlorine dioxide gas into the aqueous liquid. In a preferred embodiment, the aqueous liquid stream for the eductor system is at least one of a chlorine dioxide solution and dilution water recirculated between the eductor system and the absorption system.

In other embodiments, the chlorine dioxide gas source further includes a cooling system. The absorption system of the chlorine dioxide solution generator can also be fluidly connected to a dosing pump capable of delivering a chlorine dioxide solution from the absorption system into a pressurized water system that operates at pressures up to approximately 200 psig (1,480 kPA). The chlorine dioxide solution generator can be operated using a single precursor chemical. Furthermore, the absorption system can be fluidly connected to the chlorine dioxide gas source to recirculate residual chlorine dioxide gas into the chlorine dioxide gas source. In another embodiment, the dilution water can be fluidly connected with the absorption system.

In further preferred embodiments, the chlorine dioxide solution generator includes an anolyte loop and a catholyte loop, where the catholyte loop is fluidly connected to the anolyte loop via a common electrochemical component. The anolyte loop can further include a precursor chemical feedstock stream with at least one electrochemical cell fluidly connected to the feedstock stream. The electrochemical cell system has a positive end and a negative end where the precursor chemical feedstock stream can be directed through the electrochemical cell to produce a chlorine dioxide solution. The chlorine dioxide solution generator can further include a stripper column, where the chlorine dioxide solution is directed from the positive end of the electrochemical cell into the stripper column, and the stripper column produces a chlorine dioxide gas stream. The chlorine dioxide gas stream can exit the stripper column directed toward the eductor system. In a further embodiment, the chlorine dioxide gas stream can be a mixture of less than 10 percent chlorine dioxide gas in air.

In other embodiments, a cooling system for the chlorine dioxide solution generator maintains a chlorine dioxide gas temperature of less than 130° F. (54.4° C.). The electrochemical component of the chlorine dioxide solution generator can also operate at currents of 300 amperes or greater.

A method of generating chlorine dioxide solution that includes providing a chlorine dioxide gas source and effecting at least partial dissolution of chlorine dioxide gas into an aqueous liquid stream by employing an eductor system fluidly connected to the chlorine dioxide gas source. Additional dissolution of the chlorine dioxide gas can be effected into the aqueous liquid employing an absorption system fluidly connected to the eductor system.

In another embodiment, the method can include cooling the chlorine dioxide gas within the chlorine dioxide gas source. In further embodiments, the cooling can result in a chlorine dioxide gas temperature of less than 130° F. (54.4° C.). The chlorine dioxide gas source can further preferably operate at currents of 300 amperes or greater.

In a further embodiment, the method can include recirculating an aqueous liquid stream between the eductor system and the absorption system wherein the aqueous liquid stream for the eductor system is at least one of a chlorine dioxide solution and a dilution water. In other embodiments, the chlorine dioxide gas source can further produce a mixture of less than 10 percent chlorine dioxide gas in air.

BRIEF DESCRIPTION OF THE DRAWINGS

FIG. 2 is a side view and flow diagram of an embodiment of a cooling system for piping within a chlorine dioxide gas source.

FIG. 3 is a side view and flow diagram of an embodiment of a cooling system for operating within an interior of a stripper column of a chlorine dioxide gas source.

DETAILED DESCRIPTION OF PREFERRED EMBODIMENT(S)

The embodiments disclosed herein are intended to be illustrative and should not be read as limitations of the current disclosure.

Figure 1:
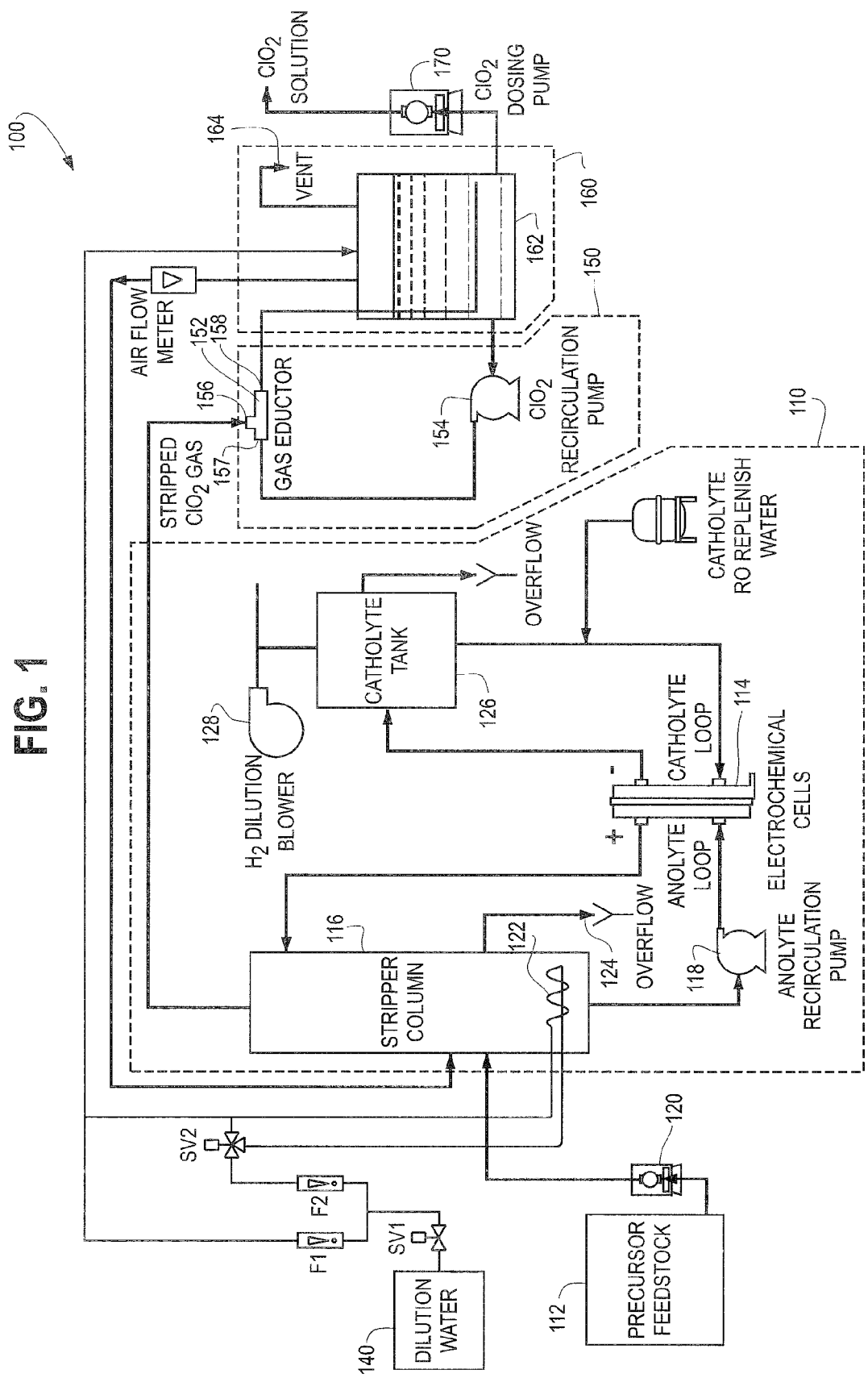
FIG. 1 is a process flow diagram of an embodiment of the present chlorine dioxide solution generator.

FIG. 1 is a process flow diagram of an embodiment of the present chlorine dioxide ($ClO_2$) solution generator 100. The process flow of FIG. 1 consists of a $ClO_2$ gas source 110, an eductor system 150 and an absorption system 160. In a preferred embodiment, chlorine dioxide gas source 110 can provide an up to 10 percent pure $ClO_2$ gas in air. In a another preferred embodiment, the concentration of $ClO_2$ gas in air is 5 percent or lower. $ClO_2$ gas source 110 can be fluidly connected to an eductor system 150 in which the $ClO_2$ gas/air mixture can be introduced into an aqueous liquid stream. The eductor system can be fluidly connected to an absorption system 160 in which the $ClO_2$ gas/air mixture can be further absorbed, that is dissolved or infused, into the aqueous liquid being circulated through eductor system 150. In a preferred embodiment, the pressure in absorption system 160 can be maintained at a relatively constant pressure of approximately 0 to 2 psig (101 to 115 kPa). The resulting $ClO_2$ solution can then be pumped from absorption system 160 using a dosing pump 170 and discharged at a pressure suitable for the end-use system.

In a preferred embodiment, the $ClO_2$ gas can be produced electrochemically through the oxidation of chlorite obtained from a precursor chemical feedstock 112, such as sodium chlorite. An electrochemical chlorine dioxide gas generator can include an anolyte loop and a catholyte loop both of which are connected to an electrochemical cell 114 or a series of such cells.

The anolyte loop can include precursor chemical feedstock 112 fluidly connected to electrochemical cell 114. In a preferred embodiment, the fluid connection between precursor chemical feedstock 112 and electrochemical cell 114 is through a stripper column 116 that is fluidly connected to an anolyte recirculation pump 118 that is further fluidly connected to electrochemical cell 114. Precursor chemical feedstock 112 can be fluidly connected to stripper column 116 with a precursor feed pump 120. Precursor chemical feedstock 112 is delivered to the positive end of electrochemical cell 114 and is oxidized to form ClO$_2$ gas, which is dissolved in an electrolyte solution along with other side products. The electrolyte solution can be directed to a stripper column 116 where the ClO$_2$ gas is stripped from the electrolyte solution to form a substantially pure ClO$_2$ gas in air. The substantially pure ClO$_2$ gas in air can then be directed to an absorption system 160 using an eductor system 150. The remaining electrolyte solution in stripper column 116 can be mixed with additional precursor chemicals from precursor chemical feedstock 112 and can then be directed back into electrochemical cell 114 using anolyte recirculation pump 118. The stripping of the ClO$_2$ gas in stripper column 116 can be effected using a heat exchanger 122 at the base of stripper column 116. In further preferred embodiments, a dilution water source 140 and an electrolyte solution overflow 124 can be fluidly connected to stripper column 116.

The catholyte loop can handle byproducts produced from the electrochemical reaction of precursor chemical feedstock 112 in the anolyte loop. These byproducts react at the negative end of electrochemical cell 114 and from there can be directed to a catholyte tank 122 fluidly connected to electrochemical cell 114. For example, where a sodium chlorite (NaClO$_2$) solution is used as precursor chemical feedstock 112, water in the catholyte loop is reduced in the reaction in electrochemical cell 114 to hydroxide and hydrogen gas. The hydroxide can remain in catholyte tank 122 while the hydrogen gas can be removed using a hydrogen gas dilution blower 128.

The reaction of the anolyte loop and catholyte loop of preferred electrochemical chlorine dioxide gas generator where sodium chlorite is used as precursor feedstock 112 is represented by the following net chemical equation:

$$2NaClO_{2(aq)} + 2H_2O \rightarrow 2ClO_{2(gas)} + 2NaOH_{(aq)} + H_{2(gas)}$$

Eductor system 150 can include a gas eductor 152. Gas eductor 152 works on a Venturi principle in which an aqueous liquid is forced through an orifice at high velocity using a recirculation pump 154 or similar means. Gas eductor 152 has at least two inlets 156, 157 and one outlet 158. One inlet 156 can be fluidly connected to stripper column 116 from ClO$_2$ gas source 110 and other inlet 157 can receive an aqueous liquid pumped from fluidly connected recirculation pump 154. The pumping of the aqueous liquid through the orifice causes a pressure drop in gas eductor 152. The pressure drop creates a vacuum in the fluid connection between ClO$_2$ gas source 110 and gas eductor 152, which causes the ClO$_2$ gas from stripper column 116 to be drawn into gas eductor 152. The ClO$_2$ gas and aqueous liquid are combined in eductor 152 and ejected from outlet 158 where the combined gas and liquid are discharged into absorption system 160. The ClO$_2$ gas can be at least partially dissolved into the aqueous liquid in eductor system 150. In a preferred embodiment, the combined ClO$_2$ gas and aqueous liquid are discharged from gas eductor 152 into absorption system 160 at or near atmospheric pressure.

In further embodiments, absorption system 160 can be fluidly connected to eductor system 150 and to the ClO$_2$ gas source 110. For example, a fluid connection can be made between an absorber tank 162, recirculation pump 154 and gas eductor 152. The aqueous liquid from gas eductor 152 is discharged into absorber tank 162 and can be at least partially pumped back into eductor system 150 through recirculation pump 154. In absorber tank 162, the ClO$_2$ gas from the combined ClO$_2$ gas and aqueous liquid discharged from gas eductor 152 can be further absorbed into the aqueous liquid to a desired concentration of ClO$_2$ solution.

The absorption system 160 can also be fluidly connected to stripper column 116 of chlorine dioxide gas source 110 to allow unabsorbed ClO$_2$ gas to return for reintroduction into eductor system 150. Absorption system 160 can also include a vent 164 to relieve pressure. In further preferred embodiments, dilution water 140 can be fluidly connected to absorber tank 162 to allow an initial quantity of aqueous liquid into absorption system 160 for initial aqueous liquid circulation and subsequent recirculation through eductor system 150 and to allow for dilution of the ClO$_2$ solution being stored in absorption tank 162. In a preferred embodiment, absorber tank 162 can be sized at 30 gallons (113.6 liters) and include level switches operating when the tank drops to 15 gallons (56.8 liters) or approaches 30 gallons (113.6 liters).

The absorption system 160 can be fluidly connected with a dosing pump 170 or similar delivery device sized for feeding the ClO$_2$ solution from absorption system 160 to an end process. Dosing pump 170 is sized to deliver a desired liquid flow rate. As ClO$_2$ solution is removed from absorption system 160, the same amount of dilution water can be introduced into absorber tank 162 to maintain the liquid level in absorber tank 162. In a preferred embodiment, dosing pump 170 is capable of delivering the ClO$_2$ solution to a pressurized water system at a delivery pressure up to approximately 200 psig (1,480 kPa). In a further preferred embodiment, a diaphragm pump can be used to minimize corrosive effects to dosing pump 170 in the ClO$_2$ environment.

An eductor is chosen based on the suction air flow rate that is desired for the gas exiting stripper column 116. In a preferred embodiment, the desired flow rate between stripper column 116 and gas eductor 152 is such that the concentration of ClO$_2$ in air is 10 percent or less. In another preferred embodiment, the ClO$_2$ gas concentration in air between stripper column 116 and gas eductor 152 is 5 percent or less. Safe and stable operation can generally be achieved with a ClO$_2$ concentration of 5 percent or less. In further embodiments, absorption tank 162 can be fluidly connected to stripper column 116 to facilitate the introduction of air to meet the desired ClO$_2$ gas concentration.

The desired air flow rate that can result in a 5 percent concentration of ClO$_2$ in air is balanced with the ClO$_2$ gas production rate. In a preferred embodiment, air flow rates with corresponding ClO$_2$ production rates that result in a 5 percent concentration of ClO$_2$ in air are listed below in Table 1.

TABLE 1

Air Flow and ClO$_2$ Production Rates for Maintaining a Five Percent ClO$_2$ Concentration in Air

| ClO$_2$ Production Rate | Air Flow Rate (actual) |
|---|---|
| 3 lbs/day (1.36 kg/day) | 0.23 ft$^3$/min (0.007 m$^3$/min) |
| 10 lbs/day (4.54 kg/day) | 0.75 ft$^3$/min (0.021 m$^3$/min) |
| 40 lbs/day (18.1 kg/day) | 3 ft$^3$/min (0.085 m$^3$/min) |
| 100 lbs/day (45.4 kg/day) | 7.5 ft$^3$/min (0.212 m$^3$/min) |

In a preferred embodiment, a Fox liquid eductor available from Fox Valve Development Corp. of Dover, N.J., USA can be used in eductor system 150. The operation of the Fox Model 129 eductor with 1.5-inch (3.81-cm) suction and discharge connections yielded the water pressure, water flow rate and air flow rate data listed below in Table 2. The operation of the Fox Model 129 eductor with 1-inch (2.54-cm) suction and discharge connections yielded the water pressure, water flow rate and air flow rate data listed below in Table 3. The water pressure and water flow were monitored at the inlet 158 of gas eductor 152. The air flow rate was monitored at inlet 156.

TABLE 2

Flow Rates Using 1.5-inch Fox Model 129 Eductor

| Water Pressure | Water Flow Rate | Air Flow Rate (actual) |
|---|---|---|
| 60 psi | 29 gallons/min | 8.3 ft$^3$/min |
| (521.7 kPa) | (109.8 liters/min) | (0.235 m$^3$/min) |
| 40 psi | 23 gallons/min | 6.3 ft$^3$/min |
| (347.8 kPa) | (87.1 liters/min) | (0.178 m$^3$/min) |

TABLE 3

Flow Rates Using 1-inch Fox Model 129 Eductor

| Water Pressure | Water Flow Rate | Air Flow Rate (actual) |
|---|---|---|
| 70 psi | 14 gallons/min | 3.3 ft$^3$/min |
| (608.7 kPa) | (53.0 liters/min) | (0.093 m$^3$/min) |
| 60 psi | 13 gallons/min | 3 ft$^3$/min |
| (521.7 kPa) | (49.2 liters/min) | (0.085 m$^3$/min) |
| 40 psi | 10 gallons/min | 2.7 ft$^3$/min |
| (347.8 kPa) | (37.9 liters/min) | (0.076 m$^3$/min) |
| 30 psi | 8.8 gallons/min | 2.2 ft$^3$/min |
| (260.9 kPa) | (33.3 liters/min) | (0.062 m$^3$/min) |
| 20 psi | 6.7 gallons/min | 1.4 ft$^3$/min |
| (173.9 kPa) | (25.4 liters/min) | (0.040 m$^3$/min) |

In another preferred embodiment, the Model 485 eductor from Schutte & Koerting of Trevose, Pa., USA with 0.75-inch (1.91-cm) suction and discharge connections can be used in eductor system 150. Water pressure, water flow rate and air flow rate data for the Schutte & Koerting eductor are listed below in Table 4. The water pressure and water flow were monitored at inlet 157 of gas eductor 152. The air flow rate was monitored at inlet 156.

TABLE 4

Flow Rates Using 0.75-in. Schutte & Koerting Model 485 Eductor

| Water Pressure | Water Flow Rate | Air Flow Rate (actual) |
|---|---|---|
| 70 psi | 8.5 gallons/min | 3.1 ft$^3$/min |
| (608.7 kPa) | (32.1 liters/min) | (0.088 m$^3$/min) |
| 60 psi | 7.8 gallons/min | 2.8 ft$^3$/min |
| (521.7 kPa) | (29.5 liters/min) | (0.079 m$^3$/min) |
| 50 psi | 6.8 gallons/min | 2.5 ft$^3$/min |
| (434.8 kPa) | (25.7 liters/min) | (0.071 m$^3$/min) |
| 40 psi | 5.8 gallons/min | 2.3 ft$^3$/min |
| (347.8 kPa) | (21.9 liters/min) | (0.065 m$^3$/min) |
| 30 psi | 4.8 gallons/min | 2.1 ft$^3$/min |
| (260.9 kPa) | (18.1 liters/min) | (0.059 m$^3$/min) |
| 20 psi | 3.5 gallons/min | 1.9 ft$^3$/min |
| (173.9 kPa) | (13.2 liters/min) | (0.053 m$^3$/min) |
| 10 psi | 2 gallons/min | 1.6 ft$^3$/min |
| (87.0 kPa) | (7.6 liters/min) | (0.045 m$^3$/min) |

In a preferred embodiment, $ClO_2$ solution generator 100 can be utilized to obtain higher yields of $ClO_2$ gas, and therefore $ClO_2$ solution, by applying a higher current to electrochemical cell 114 than those previously applied. As the current applied to the cell is increased the quantity of $ClO_2$ that can be generated increases. Applying a higher current to the cell increases the rate of the selective oxidation reaction of, for example, chlorite to $ClO_2$, which can result in a higher yield of $ClO_2$ gas. A higher yield of $ClO_2$ gas can result in a higher yield of $ClO_2$ solution. The high-capacity current can be greater than 50 amperes, but a preferred embodiment contemplates cooling for a generator system that operates at a current greater than 120 amperes. In another preferred embodiment, the electrochemical cell can operate at a current of 300 amperes or greater.

FIG. 2 illustrates an embodiment of present cooling system 200 for use, for example, with piping that may be used within $ClO_2$ gas source 110 (shown in FIG. 1). This cooling system 200 can be interposed in the fluid connection between precursor chemical feedstock 112 (shown in FIG. 1) and an electrochemical cell 114 (shown in FIG. 1) such that precursor chemical feedstock 112 is directed through cooling system 200 before entering electrochemical cell 114. Cooling system 200 can also be interposed in the fluid connection between electrochemical cell 114 and stripper column 116 (shown in FIG. 1) such that a $ClO_2$ solution directed from the positive end of electrochemical cell 114 is directed through cooling system 200. Cooling system 200 can also be interposed in the fluid connection between electrochemical cell 114 and catholyte tank 126 (shown in FIG. 1) such that a byproduct stream directed from the negative end of electrochemical cell 114 is directed through cooling system 200.

The cooling system 200 can have an inner tube 202. Precursor chemical feedstock 112 or $ClO_2$ solution can enter inner tube 202 through an inlet 204, pass through inner tube 202 and exit through an outlet 206. Inner tube 202 can be made out of material that is inert to $ClO_2$. Metals such as titanium and tantalum can be used or inert plating materials may also be used.

The inner tube 202 is surrounded by an outer jacket 208. Coolant enters outer jacket 208 through a coolant inlet 210 and exits through a coolant outlet 212. Outer jacket 208 should be made of an insulating material such as poly(vinyl chloride) (PVC), chlorinated poly(vinyl chloride) (CPVC) or poly(tetrafluoroethylene) (trade name Teflon®). A coolant material, such as water or silicon oil, can be cooled with Freon® or equivalent materials and then pumped through outer jacket 208. The coolant material then cools precursor chemical feedstock 112 or $ClO_2$ solution inside inner tube 202. It is desirable that the coolant temperature is such that it cools precursor chemical feedstock 112 or $ClO_2$ solution to a temperature of less than 130° F. (54.4° C.) and allows downstream $ClO_2$ gas to also be below 130° F. (54.4° C.). However, it is desirable that the coolant material does not freeze precursor chemical feedstock 112 or chlorine dioxide solution. It is further desirable that the Freon® or equivalent material does not lower the temperature of the coolant material to a point where the coolant material cannot be pumped through outer jacket 208.

FIG. 3 illustrates another embodiment of present cooling system 300 for operating within the interior of a stripper column 116 (shown in FIG. 1) of $ClO_2$ gas source 110 (shown in FIG. 1). The cooling system is made up of a coiled tube 302 placed within a $ClO_2$ gas source 110. Coiled tube 302 can comprise a material that is inert to chlorine dioxide such as titanium or tantalum. A coolant material is directed through coiled tube 302. The coolant enters through a coolant inlet 304 is directed through coiled tube 302 and exits from a coolant outlet 306. Possible coolant materials can include water and silicon oil. The coolant material can be cooled by Freon® or equivalent materials and pumped through coiled tube 302.

The cooling system 300 can be located in the interior space of a stripper column 116. The coolant material flows through coiled tube 302 and cools the solution in stripper column 116. It is desirable that the coolant temperature is such that it cools the solution to a temperature of less than 130° F. (54.4° C.) and allows downstream $ClO_2$ gas to also be below 130° F. (54.4° C.). However, the coolant material temperature should also be such that it does not cause the solution to freeze.

Figure 4:
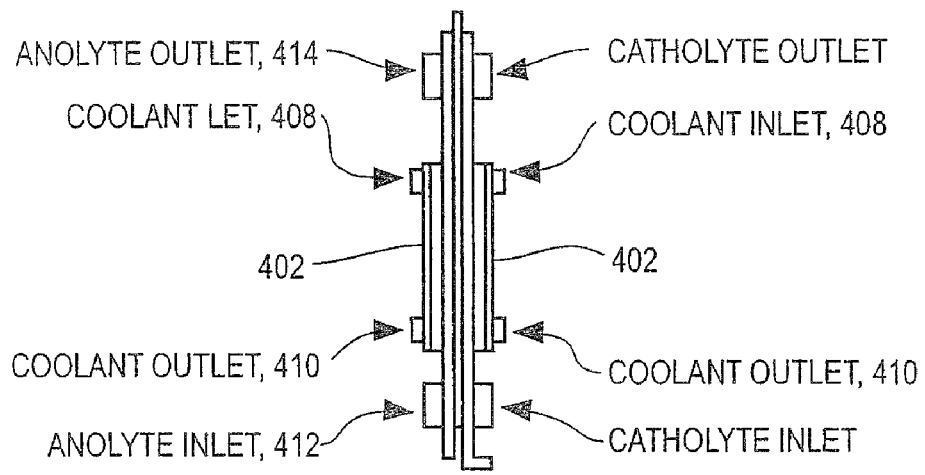
FIG. 4 is a side view and flow diagram of an embodiment of a cooling system for operating in proximity to a surface of an electrochemical cell of a chlorine dioxide gas source.

FIG. 4 illustrates a cross sectional diagram of another embodiment of present cooling system 400 functioning within $ClO_2$ gas source 110 (shown in FIG. 1) in proximity with the surface of an electrochemical cell 114 (shown in FIG. 1). Cooling system 400 comprises a chamber 402 in proximity with the positive end or negative end of electrochemical cell 114. It is preferred that the proximity of chamber 402 to the electrochemical cell is such that chamber 402 effects cooling of electrochemical cell 114. Chamber 402 may be in direct contact or adjacent to electrochemical cell 114. Coolant material enters chamber 402 through a coolant inlet 408, is directed through chamber 402 and exits from a coolant outlet 410. The coolant material can be a non-conducting material such as pure water or silicon oil. The coolant material can be cooled using Freon® or equivalent materials and then pumped through chamber 402.

The precursor chemical feedstock 112 (shown in FIG. 1) enters the positive end of electrochemical cell 114 through an anolyte inlet 412, where precursor chemical feedstock 112 can be oxidized to form a $ClO_2$ gas, which is dissolved in an electrolyte solution along with other side products. The $ClO_2$ solution with the side products can be directed out of electrochemical cell 114 at anolyte outlet 414. The $ClO_2$ solution can then be cooled by the coolant material in chamber 402. It is desirable for the coolant material temperature to be such that the coolant material cools the downstream $ClO_2$ gas and the $ClO_2$ solution or the catholyte solution to a temperature of less than 130° F. (54.4° C.). However, it is further desirable that the coolant temperature does not freeze the chlorine dioxide solution or catholyte solution.

Figure 5:
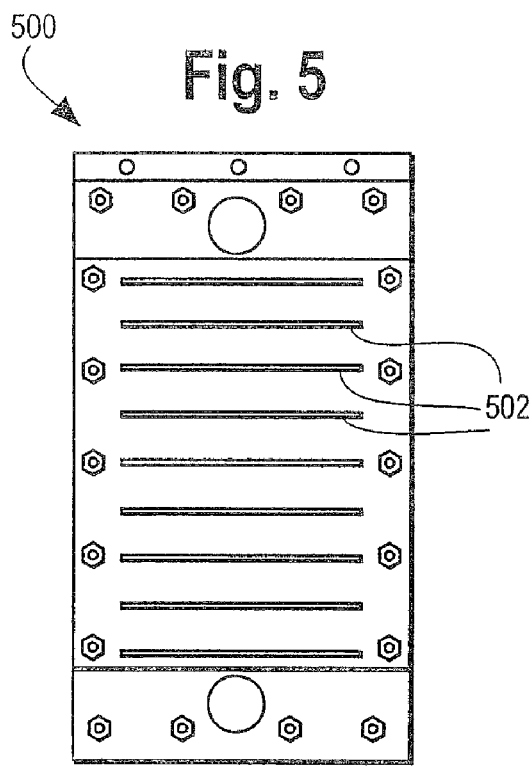
FIG. 5 is a frontal view of an electrochemical cell having a plurality of fins in accordance with an embodiment of the present disclosure.

Another embodiment of the present cooling system is where a fluid circulation apparatus is located so as to direct fluid flow onto the surface of electrochemical cell 500, such as shown by the example in FIG. 5. A fluid can be a liquid or gas tending to flow or conform to the outline of its container. Examples of fluids include water, air, oil and an inert gas. One embodiment blows air onto the surface of an electrochemical cell 500. This cools the chlorine dioxide solution as it passes through electrochemical cell 500.

In order to increase the effectiveness of cooling by the fluid circulation apparatus a plurality of fins 502 can be added to the surface of electrochemical cell 500. FIG. 5 illustrates a frontal view of the surface of an electrochemical cell 500 having a plurality of fins 502 in accordance with an embodiment of the present disclosure. The plurality of fins 502 can be made of a metal such as stainless steel or copper or other such material that may be used to build the structure of the electrochemical cell. The plurality of metal fins 502 increases the total cooling surface area of the electrochemical cell, resulting in more effective cooling.

Figure 6:
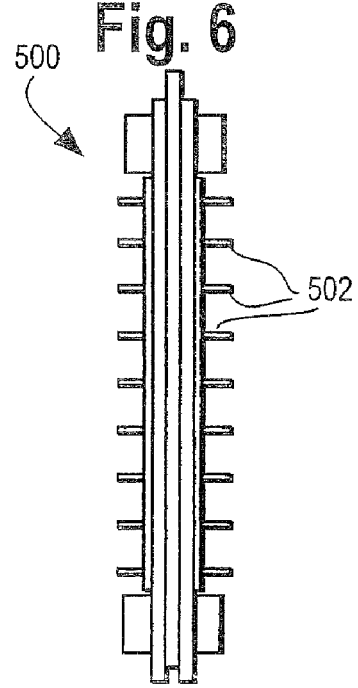
FIG. 6 is a side view of an electrochemical cell having a plurality of fins in accordance with an embodiment of the present disclosure.

FIG. 6 illustrates a side view of an electrochemical cell having a plurality of fins 502 in accordance with an embodiment of the present disclosure.

As an example of the $ClO_2$ cooling using coolant material, when a current applied to an electrochemical cell in a $ClO_2$ gas generator increases, the temperature of the $ClO_2$ solution increases. However, by using the cooling coil or jacket as outlined in this disclosure a temperature of 65° F. –85° F. (18.3° C. –29.4° C.) can be maintained.

$ClO_2$ gas can be made using many different processes and the present chlorine dioxide solution generator can be used with a variety of such processes. Such processes include, but are not limited to, using electrochemical cells and a sodium chlorite solution, acidification of chlorite, reduction of chlorates by acidification, and reduction of chlorates by sulfur dioxide.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A chlorine dioxide solution generator comprising:
   (a) a chlorine dioxide gas source comprising a packed stripper column under vacuum capable of producing a substantially pure chlorine dioxide gas stream by vacuum;
   (b) an eductor system for at least partially effecting the dissolution of said substantially pure chlorine dioxide gas stream into an aqueous liquid stream wherein said eductor system comprises one inlet fluidly connected to said chlorine dioxide gas source, said substantially pure chlorine dioxide gas stream exiting said packed stripper column directed to said eductor system via said inlet fluidly connected to said chlorine dioxide gas source, a second inlet for receiving an aqueous liquid fluidly connected to a recirculation pump and an outlet wherein pumping of said aqueous liquid creates a vacuum in said packed stripper column; and
   (c) an absorption system fluidly connected to said eductor system via said outlet that is capable of effecting additional dissolution of said chlorine dioxide gas into said aqueous liquid wherein said absorption system is fluidly connected to a dosing pump capable of delivering a chlorine dioxide solution from said absorption system into a pressurized water system.

2. The chlorine dioxide solution generator of claim 1, wherein said aqueous liquid stream for said eductor system is at least one of a chlorine dioxide solution and a dilution water recirculated between said eductor system and said absorption system.

3. The chlorine dioxide solution generator of claim 1, wherein said chlorine dioxide gas source further comprises a cooling system.

4. The chlorine dioxide solution generator of claim 3, wherein said cooling system maintains a chlorine dioxide gas temperature of less than 130° F. (54.4° C.).

5. The chlorine dioxide solution generator of claim 3, wherein said chlorine dioxide gas source comprises an electrochemical component operating at a current between 120 amperes and 300 amperes.

6. The chlorine dioxide solution generator of claim 3, wherein said chlorine dioxide gas source comprises an electrochemical component operating at a current greater than 300 amperes.

7. The chlorine dioxide solution generator of claim 1, wherein said absorption system is fluidly connected to a dosing pump capable of delivering a chlorine dioxide solution from said absorption system into a pressurized water system that operates at pressures up to approximately 200 psig (1,480 kPA).

8. The chlorine dioxide solution generator of claim 1, wherein said chlorine dioxide gas source operates using a single precursor chemical.

9. The chlorine dioxide solution generator of claim 1, wherein said absorption system is fluidly connected to said chlorine dioxide gas source to recirculate residual chlorine dioxide gas into said chlorine dioxide gas source.

10. The chlorine dioxide solution generator of claim 1, wherein said chlorine dioxide gas source further comprises an anolyte loop and a catholyte loop, said catholyte loop fluidly connected to said anolyte loop via a common electrochemical component.

11. The chlorine dioxide solution generator of claim 10, wherein said anolyte loop comprises:

(a) a precursor chemical feedstock stream; and
(b) at least one electrochemical cell fluidly connected to said feedstock stream, said electrochemical cell system having a positive end and a negative end, said precursor chemical feedstock stream directed through said at least one electrochemical cell to produce a chlorine dioxide solution; and
(c) said packed stripper column, said chlorine dioxide solution directed from said positive end of said at least one electrochemical cell into said packed stripper column.

12. The chlorine dioxide solution generator of claim 11, wherein said chlorine dioxide gas stream is a mixture of less than 10 percent chlorine dioxide gas in air.

* * * * *